(12) United States Patent
Vemuri et al.

(10) Patent No.: US 11,605,266 B2
(45) Date of Patent: Mar. 14, 2023

(54) SYSTEMS AND METHODS FOR PROGRESSIVE METER MANAGEMENT USING IMAGE ANALYSIS

(71) Applicant: SG Gaming, Inc., Las Vegas, NV (US)

(72) Inventors: Sudheer Vemuri, Henderson, NV (US); Ram Kumar Karnataka, Henderson, NV (US)

(73) Assignee: SG Gaming, Inc., Las Vegas, NV (US)

(*) Notice: Subject to any disclaimer, the term of this patent is extended or adjusted under 35 U.S.C. 154(b) by 164 days.

(21) Appl. No.: 17/167,396

(22) Filed: Feb. 4, 2021

(65) Prior Publication Data

US 2021/0248872 A1    Aug. 12, 2021

Related U.S. Application Data

(60) Provisional application No. 62/970,891, filed on Feb. 6, 2020.

(51) Int. Cl.
| | | |
|---|---|---|
| *G07F 17/32* | (2006.01) | |
| *G06T 7/11* | (2017.01) | |
| *G06N 3/04* | (2006.01) | |

(52) U.S. Cl.
CPC .......... *G07F 17/3258* (2013.01); *G06N 3/04* (2013.01); *G06T 7/11* (2017.01); *G07F 17/3211* (2013.01); *G07F 17/3223* (2013.01); *G07F 17/3225* (2013.01)

(58) Field of Classification Search
None
See application file for complete search history.

(56) References Cited

U.S. PATENT DOCUMENTS

| | | |
|---|---|---|
| 5,611,730 A | 3/1997 | Weiss |
| 6,015,347 A | 1/2000 | Maahs et al. |
| 7,766,745 B1 | 8/2010 | Green |
| 8,357,038 B2 | 1/2013 | D'Amico et al. |
| 8,821,274 B2 | 9/2014 | Lyons et al. |
| 9,039,522 B2 | 5/2015 | Guan et al. |
| 9,189,921 B2 | 11/2015 | Spencer et al. |
| 9,679,437 B2 | 6/2017 | Detlefsen et al. |
| 10,204,485 B2 | 2/2019 | Korthauer et al. |
| 10,210,710 B2 * | 2/2019 | Lyons ................ G07F 17/3258 |
| 10,733,843 B2 * | 8/2020 | Walsh ................ G07F 17/3258 |
| 10,777,037 B1 | 9/2020 | Nelson et al. |
| 2013/0053135 A1 | 2/2013 | King |
| 2013/0065676 A1 | 3/2013 | Owen et al. |

(Continued)

*Primary Examiner* — Ronald Laneau

(57) ABSTRACT

A gaming system including logic circuitry receives image data associated with an image captured by at least one image sensor of a portable computing device, detects a progressive meter associated with a progressive jackpot within the captured image using object recognition and segmentation applied to a plurality of pixels of the image data, automatically determines a current progressive value of the progressive meter based on the plurality of pixels of the image data, transmits a verification message including the current progressive value to the portable computing device, in response to the verification message, receives a value response from the portable computing device, and in response to the value response approving the current progressive value, stores the current progressive value for the progressive jackpot in a progressive jackpot database.

23 Claims, 6 Drawing Sheets

(56) References Cited

U.S. PATENT DOCUMENTS

| | | | |
|---|---|---|---|
| 2014/0248941 A1* | 9/2014 | Nelson | G07F 17/3241 463/25 |
| 2019/0164384 A1* | 5/2019 | Soukup | G07F 17/3239 |
| 2020/0294359 A1* | 9/2020 | Bulzacki | G07F 17/3223 |

* cited by examiner

SYSTEMS AND METHODS FOR PROGRESSIVE METER MANAGEMENT USING IMAGE ANALYSIS

CROSS-REFERENCE TO RELATED APPLICATIONS

This application claims the benefit of priority to U.S. Provisional Application No. 62/970,891, filed Feb. 6, 2020, the contents of which are hereby incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021, SG Gaming, Inc.

FIELD

The present disclosure relates generally to gaming systems, apparatus, and methods and, more particularly, to managing progressive jackpot meters using image analysis.

BACKGROUND

The gaming industry uses various game features, presentations, and the like to attract and engage potential players to gaming machines. One such feature may be a progressive jackpot. A progressive jackpot is a jackpot that is funded over time (e.g., through the distribution and allocated of received wagers) and potentially over multiple player sessions and/or gaming machines, thereby facilitating increased jackpot amounts. The progressive jackpot may be associated with one or more trigger conditions that, when detected, award a winning player with a progressive jackpot award, which may be all or a portion of the progressive jackpot amount. As progressive jackpot awards are distributed, the accrued value of a progressive jackpot may reach a seed threshold (e.g., zero), and the progressive jackpot may be re-seeded for subsequent progressive jackpot awards. For at least some known gaming machines, the gaming machines may include a progressive meter within a display (digital, mechanical, or combinations thereof) that provides a visible indicator to players what the current value of the progressive jackpot is.

Given the potential high value and dynamic nature of progressive jackpots, jackpot providers and/or regulators of the gaming industry may implement and/or require some management of the progressive jackpots. The jackpot providers may implement a network-based system for receiving updates from the gaming machines associated with the progressive jackpots of any wagers, jackpot trigger conditions, and/or the current value of a respective progressive jackpot. However, in some jurisdictions, regulators (or the jackpot providers themselves) may require an additional or alternative method for verifying the current value of a progressive jackpot. For example, at least some known systems for managing progressive jackpots may not be linked to a network, but rather are verified manually (i.e., in-person). That is, one or more technicians may be deployed around a gaming environment to review the progressive jackpot amounts. At least some technicians may be required to write out information from each gaming machine and then enter the written information within a database for storage and verification. The technicians may be required to identify the identity of the gaming machine or game, the current progressive value from the progressive meter, and the time at which the technician read the progressive meter.

This process may be both time-consuming and prone to human error. Accordingly, a system is needed for verifying current values of progressive jackpots while reducing the impact and effect of human resources in the process.

SUMMARY

According to one aspect of the present disclosure, a gaming system comprises logic circuitry receives image data associated with an image captured by at least one image sensor of a portable computing device, detects a progressive meter associated with a progressive jackpot within the captured image using object recognition and segmentation applied to a plurality of pixels of the image data, automatically determines a current progressive value of the progressive meter based on the plurality of pixels of the image data, transmits a verification message including the current progressive value to the portable computing device, in response to the verification message, receives a value response from the portable computing device, and in response to the value response approving the current progressive value, stores the current progressive value for the progressive jackpot in a progressive jackpot database.

According to another aspect of the disclosure, a method for managing progressive jackpots is provided. The method includes receiving, by logic circuitry, image data associated with an image captured by at least one image sensor of a portable computing device, automatically determining, by the logic circuitry, a current progressive value of a progressive meter associated with a progressive jackpot using object recognition and segmentation applied to a plurality of pixels of the image data, and transmitting, by the logic circuitry, a verification message including the current progressive value to the portable computing device to verify the current progressive value.

According to yet another aspect of the disclosure, a gaming system comprises logic circuitry. The logic circuitry receives image data associated with an image captured by at least one image sensor of a portable computing device, automatically determines a current progressive value of a progressive meter associated with a progressive jackpot using object recognition and segmentation applied to a plurality of pixels of the image data, and transmits a verification message including the current progressive value to the portable computing device to verify the current progressive value.

Additional aspects of the invention will be apparent to those of ordinary skill in the art in view of the detailed description of various embodiments, which is made with reference to the drawings, a brief description of which is provided below.

Figure 1:
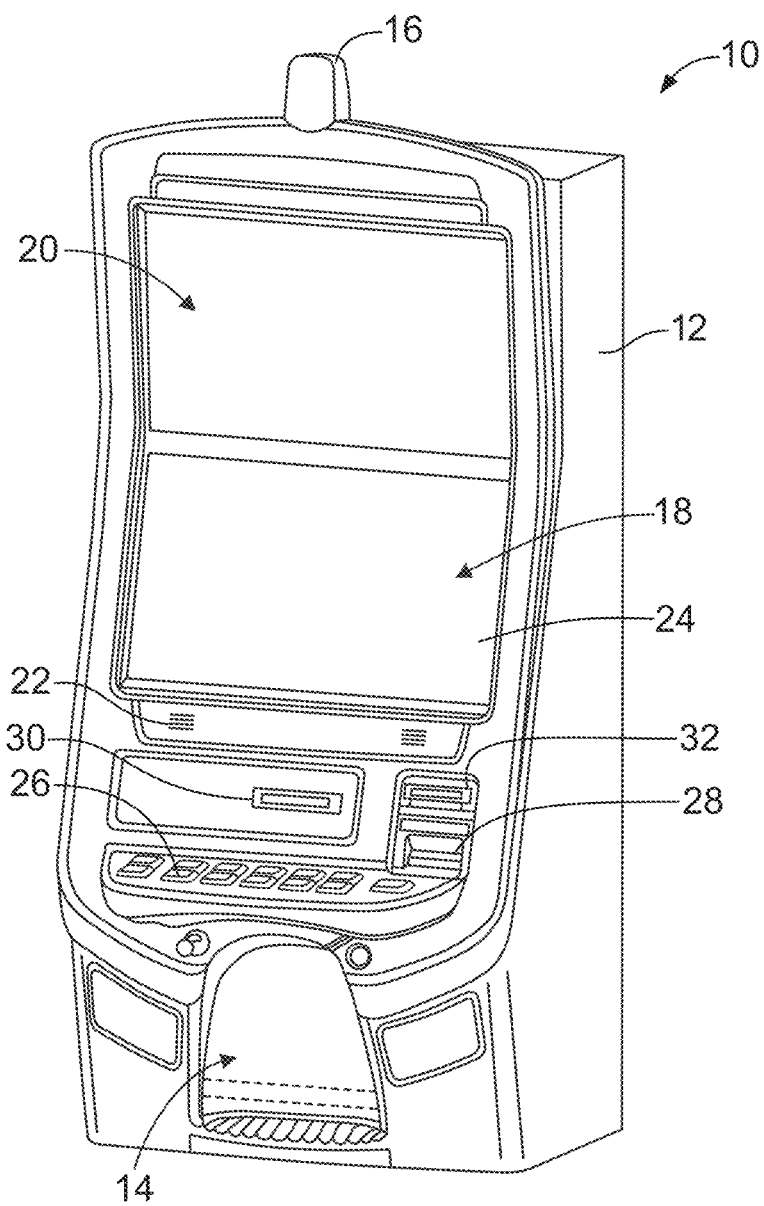
FIG. 1 is perspective view of a free-standing gaming machine according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

As used herein, the term "current" when referring to a value, particularly a value of a progressive jackpot, may not be limited to the real-time value of the progressive jackpot. Rather, "current value" may be tied to a particular timestamp such that the current value is the value of the progressive jackpot at the timestamp. For example, using the system described in more detail herein, an image of a progressive meter is taken and a timestamp is associated with the image. If image analysis is applied to the image and the value indicated by the progressive meter is extracted, that value may be considered the "current value" at the time indicated by the timestamp, though the actual real-time value of the progressive meter may have changed. The timestamp may be used as described herein to provide context to the current value and facilitate improved coordination between the current value and a progressive jackpot amount indicated by other mechanisms, such as a network-based messaging mechanism for report jackpot amounts.

The systems and methods described herein are related to management of progressive jackpots. In particular, the systems and methods described herein facilitate improved "manual" collection and verification of current progressive meter readings. The manual process may involve a technician or other attendant to inspect the progressive meter readings in-person. Rather than rely upon manual entry of the progressive meter readings, which may result in increased errors and additional allocation of resources to complete, the systems and methods described herein may aid the technician by performing image analysis on images captured by the technician of the gaming machines with progressive meters. More specifically, the technician may use his or her portable computing device (or another suitable device) to capture an image of a gaming machine that includes a display with the progressive meter. Image data associated with the captured image may be analyzed locally or transmitted to a server computing device to detect any progressive meter within the captured image and the current progressive value.

The systems described herein may employ deep learning in combination with a database of progressive meter images to refine image analysis for progressive meters. In at least some embodiments, a game identifier associated with the gaming machine and/or the game presented by the gaming machine may be used in combination with the image data to retrieve images from the database that are the same or similar to the progressive meter within the captured image. Once a progressive meter is detected and the current progressive value is determined (e.g., by detecting text indicating the current progressive value or another suitable optical identifier), the determined current progressive value may be transmitted to the portable computing device for the associated technician or attendant to review. The technician may then provide user input to confirm the current progressive value or override the current progressive value if the determined value was incorrect. In addition to storing the current progressive value (or the value provided by the technician if the current progressive value was overridden), the deep learning employed by the systems and methods described herein facilitate continued refinement of the image analysis by incorporating the feedback provided by the technician.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat.

Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
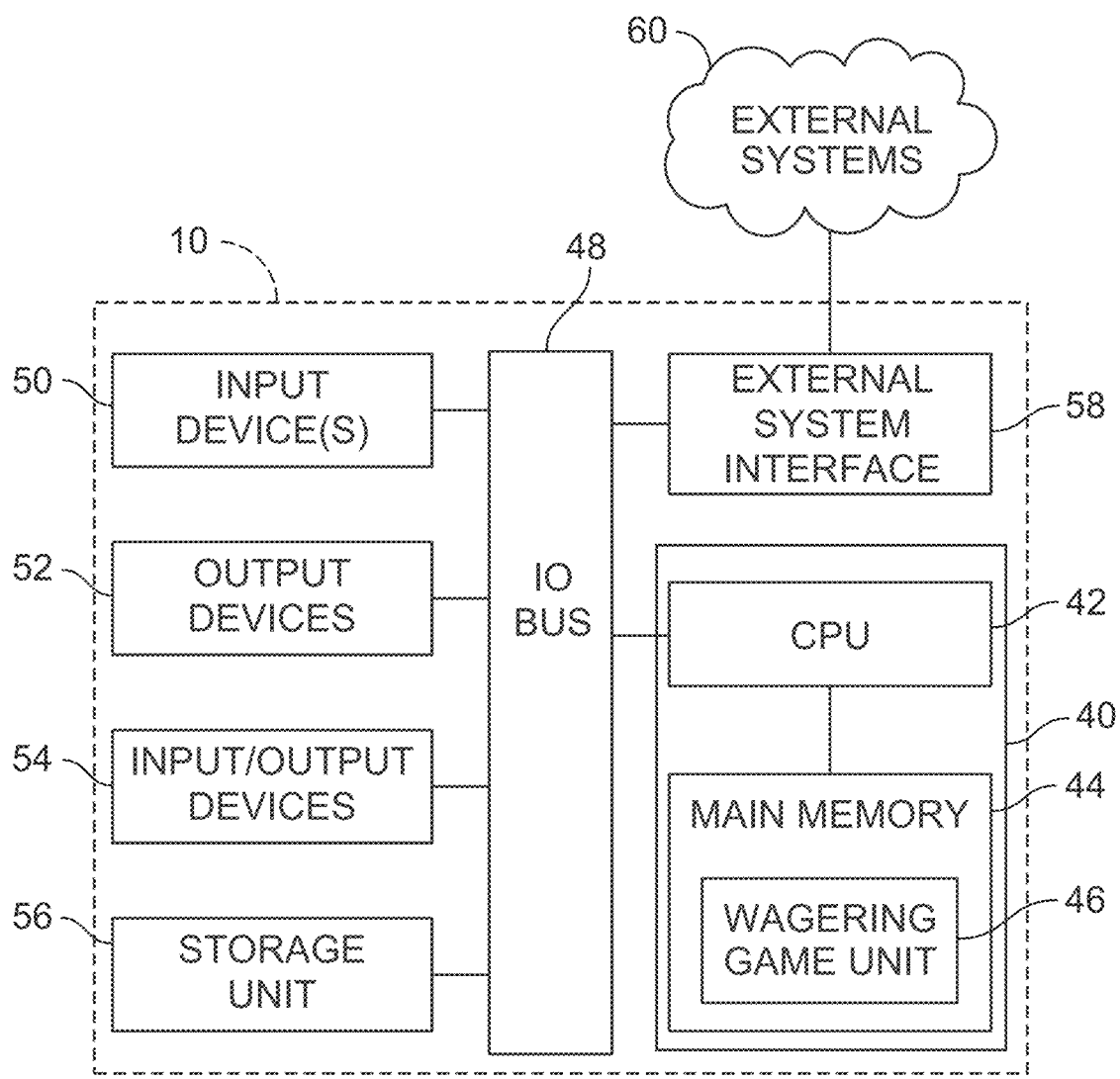
FIG. 2 is a schematic view of a gaming system according to one or more embodiments of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
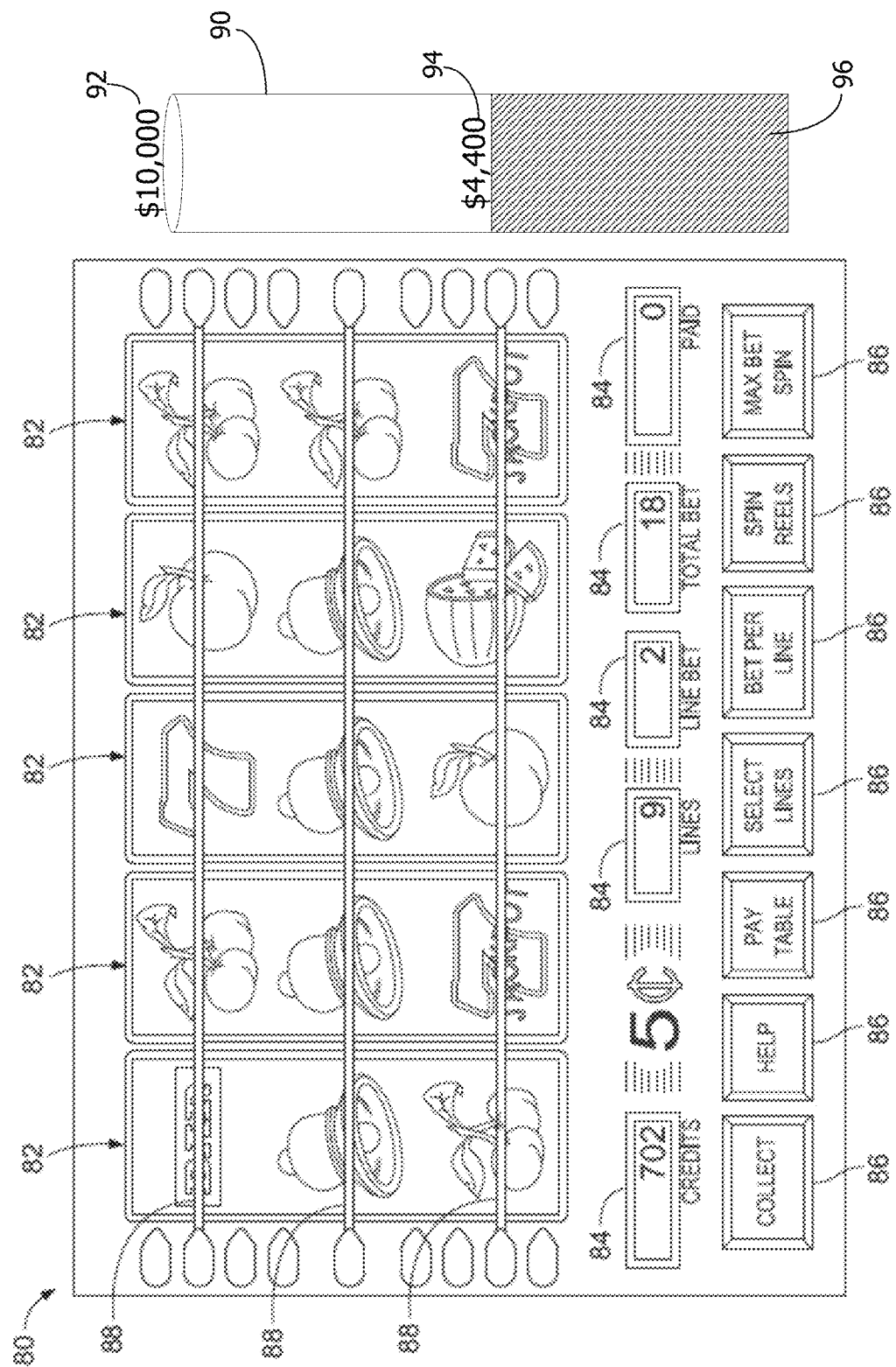
FIG. 3 is an image of an exemplary basic-game screen of a wagering game displayed on a gaming machine, according to one or more embodiments of the present disclosure.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

FIG. 3 further includes an exemplary progressive meter 90 for a progressive jackpot feature. Over a period of time (and potentially multiple gaming sessions), funds are allocated to the progressive jackpot feature (e.g., by allocating a portion of wagers at the gaming machine 10 to the progressive jackpot feature). By accruing funds over time, the progressive jackpot feature may facilitate increased jackpot awards for players that trigger the bonus jackpot. In one example, one or more winning outcomes of the base game on the reels 82 may be a trigger condition for a bonus jackpot award. The bonus jackpot award may be all or a portion of a current jackpot value of the progressive jackpot. In other embodiments, other suitable trigger conditions may be used to determine progressive jackpot winning outcomes. For example, the progressive jackpot may be associated with a bonus game of the gaming machine rather than the base game. In certain embodiments, multiple progressive jackpots and/or progressive meters 90 may be presented for a casino wagering game.

In the example embodiment, the progressive meter 90 provides visual indication to the player of a maximum jackpot award amount 92 and a current progressive value, which is indicated by a current progressive amount 94 and a current progressive bar 96. The current progressive value indicates to the player the amount of jackpot funds that are available now if a progressive jackpot award is won, and the maximum jackpot award amount 92 is the maximum that the player can win from the progressive jackpot. If no progressive jackpot winning outcome is detected and the maximum jackpot award amount 92 is reached, additional funds accrued for the progressive jackpot may be allocated to a subsequent progressive jackpot.

As described herein, management of the progressive jackpots may include monitoring and tracking funds associated with the progressive jackpots. That is, to account for the various avenues of funds accrual (e.g., wagers) and the various avenues of funds dispersal (e.g., jackpot awards), systems may be provided to track the current progressive value in comparison to the transactions associated with the progressive jackpot. If the current progressive value does not match the transactions, additional auditing may be performed to resolve any missing, duplicated, or otherwise incorrect information related to the progressive jackpots. As described herein, one or more methods of tracking the current progressive value may be used to monitor and verify the current progressive value, which may include methods incorporating image analysis of displays and/or interfaces presenting the progressive meter 90.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

The systems and methods described herein are related to progressive jackpot management. In particular, the systems and methods described herein incorporate capturing an image of one or more progressive meters presented by a gaming machine and performing image analysis on the image to identify the current progressive value(s) as indicated by the progressive meters. The systems and methods may facilitate reduced resource allocation and reduced input errors for in-person verification of current progressive values while maintaining the benefit of human review and verification of the current progressive values.

Figure 4:
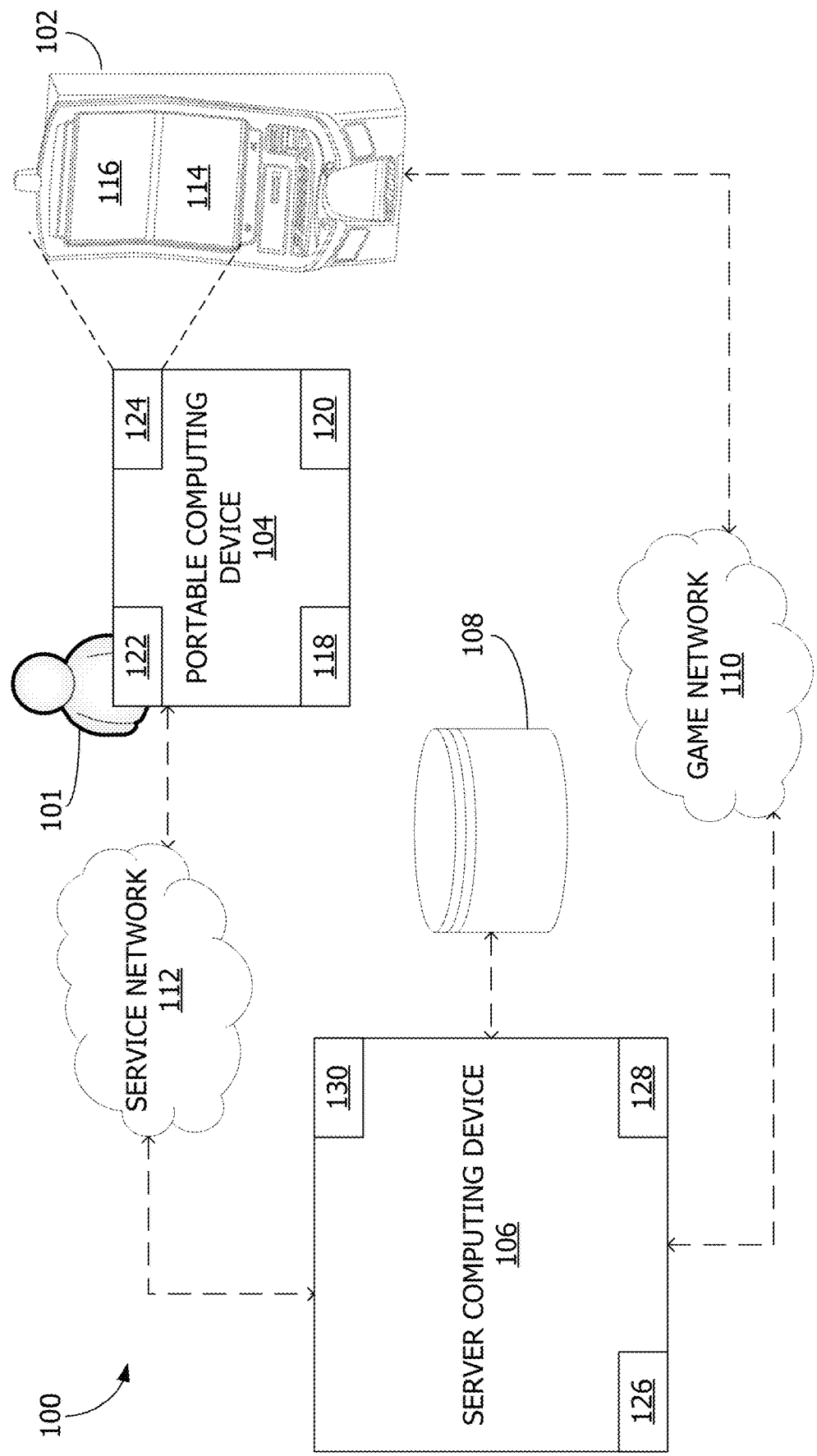
FIG. 4 is a block diagram of an example gaming system according to one or more embodiments of the present disclosure.

FIG. 4 is a block diagram of an example gaming system 100 for managing progressive jackpots. The system 100 includes a gaming machine 102, a portable computing device 104, a server computing device 106, a progressive jackpot database 108, a game network 110, and a service network 112. The gaming machine 102 may be substantially similar to the gaming machine 10 shown in FIG. 1. In other embodiments, the system 100 may include additional, fewer, or alternative devices in a suitable configuration, including those described elsewhere herein. For example, the portable computing device 104 may not be a part of the system 100, but rather is in communication with the system 100.

In the example embodiment, the gaming machine 102 is configured to conduct one or more casino wagering games. The gaming machine 102 includes a primary display 114 and a secondary display 116 that present display content associated with the one or more casino wagering games. In the example embodiment, the display content includes at least one progressive meter associated with one or more progressive jackpots. Although digital displays are used in the embodiments described herein, it is to be understood that the displays 114, 116 may be mechanical or electromechanical such that the display content is not limited to graphical images on a digital display. In some embodiments, the gaming machine 102 may be associated with one or more external displays configured to present display content associated with the gaming machine 102. For example, a progressive jackpot may be associated with a plurality of gaming machines 102, and an external display may be configured to present one or more progressive meters of the progressive jackpot. The external display may be positioned to enable players at each of the associated gaming machines 102 to view the progressive meters.

The gaming machine 102 is in communication with the game network 110 to transmit and receive data associated with the one or more casino wagering games. Such data may include, but is not limited to, game data, accounting data (e.g., receiving funds from wagers and dispensing funds for winning outcomes), player account data, and jackpot data. The jackpot data may indicate a current progressive value of the progressive jackpot and/or other suitable data related to the progressive jackpot. The data communicated via the game network 110 may be transmitted in response to one or more events (e.g., a wager or winning outcome) and/or on a periodic basis.

Although jackpot data may be communicated via the game network 110, additional verification of the current progressive value may be required. For example, some jurisdictions may require addition verification of the current progressive value to ensure the correct amount is awarded to players winning the progressive jackpot. In the example embodiment, a technician 101 or attendant may be deployed in a gaming environment including the gaming machine 102 to verify the current progressive amount. More specifically, the technician 101 may use the portable computing device 104 to capture images of progressive meters on gaming machines. The portable computing device 104 may be a phone, tablet, laptop, or other suitable device that the technician 101 can carry or otherwise affix to themselves.

The portable computing device 104 includes one or more processors 118, memory 120, a communication interface 122, and at least one image sensor 124. The processors 118, memory 120, and the communication interface 122 may operate together as mobile or portable logic circuitry such that functionality attributed to logic circuitry as described herein may be performed by the components of the portable computing device 104. The memory 120 is configured to store instructions that, when executed by the processors 118, cause the portable computing device 104 to function as described herein. The memory 120 may store, for example, an application associated with the system 100 to enable the portable computing device 104 to function as described herein. The communication interface 122 is configured to facilitate communication (wired and/or wireless) between the portable computing device 104 and another device, such as the server computing device 106, via one or more communication protocols. The portable computing device 104 may also include other components that enable a user to interact with the portable computing device 104, such as, and without limitation, a display, input devices, audio output devices, and the like.

The at least one image sensor 124 is configured to capture images. In particular, the technician 101 may orient the portable computing device 104 to capture one or more images of a gaming or display interface including one or more progressive meters associated with the gaming machine 102. As used herein, a "gaming interface" or "display interface" is at least a portion of a display (e.g., the displays 114, 116) and/or another suitable visual component (e.g., a lighting assembly) that conveys information to viewers, including information associated with one or more progressive meters of one or more progressive jackpots. The gaming interface may by presented by the gaming machine 102 or an external device, such as an external display associated with the gaming machine 102.

In certain embodiments, the portable computing device 104 may prompt the technician 101 (via audible or visual prompts) to position and orient the portable computing device 104 a particular way to capture images of a gaming interface suited for the image analysis described herein. For example, a display of the portable computing device 104 may present a preview image with instructions and superimposed border guidelines to assist the technician in lining up the gaming interface within the preview image prior to capturing the image. In response to capturing the image, the portable computing device 104 may be configured to generate image data associated with the image. The image data may include the image itself as a matrix of pixels or the portable computing device 104 may be configured to convert the image into a format suitable for analysis and/or transmission as described herein. In the example embodiment, the portable computing device 104 transmits the image to the server computing device 106 via the service network 112.

The server computing device 106 is configured to at least manage one or more progressive jackpots. In certain embodiments, the server computing device 106 may perform additional tasks and functionality related to gaming not explicitly detailed herein. The server computing device 106 includes one or more processors 126, memory 128, and a communication interface 130, which may be similar to or different from the processors 118, memory 120, and the communication interface 122 of the portable computing device 104. In some embodiments, the server computing device 106 may be a distributed device. That is, multiple separate computing devices in communication with one another may form the server computing device 106, and the functionality of the server computing device 106 may be distributed across the computing devices. In other embodiments, the server computing device 106 may be a singular device.

The server computing device 106 may be in communication with both the game network 110 and the service network 112 to receive data associated with progressive jackpots. The server computing device 106 may receive jackpot data from the gaming machine 102 via the game network 110 and image data from the portable computing device 104 via the service network 112. The service network 112 may be configured for secure communication between authorized devices (e.g., the portable computing device 104 and the server computing device 106), or the service network 112 may be publicly accessible network with configurable secure network communications, such as the internet or a local area network (LAN) of a gaming environment. In other embodiments, the game network 110 and the service network 112 may be the same network. The game network 110 and the service network 112 may include network infrastructure, such as network devices (routers, switches, modems, wireless access points, etc.) that facilitate communication between devices in communicatively coupled to the respective network 110, 112. In some embodiments, the server computing device 106 may be included within the network infrastructure of the game network 110 and/or the service network 112. For example, the server computing device 106 may be an edge device through which other devices (e.g., the gaming machine 102 and/or the portable computing device 104) connect to the networks 110, 112. In some embodiments, the server computing device 106 may not be in communication with the game network 110 such that data associated with the gaming machine 102 may be limited to the data described herein over the service network 112.

In the example embodiment, the server computing device 106 is configured to receive the image data from the portable computing device 104 via the service network 112 to determine a current progressive value of the progressive jackpot associated with the gaming machine 102. More specifically, the server computing device 106 is configured to analyze the image data using one or more machine-learning (ML) models, such as a convolutional neural network (CNN) model. CNN models and the like may be used to detect the presence of objects within an image and classify said objects (or a plurality of pixels of the image associated with the object) into one or more predefined classes (e.g., "meter", "text", "value", etc.). This process or set of processes of detecting objects, attributing pixels to each detected object, and identifying the objects (which, for values or text, may include determining what values, words, phrases, and the like are present) may be referred to herein as "object recognition and segmentation." It is to be understood that "object recognition" may refer to object detection and/or object classification, while "segmentation" refers to the attribution of particular pixels within an image to a detected object, and that any suitable combination of these processes may be used by the system 100.

In the example embodiment, at least one CNN model is used by the server computing device 106 for object recognition and segmentation in image data. A CNN model may include several layers of equations for matrix analysis. For example, the CNN model may include at least one convolution layer, at least one pooling layer, and a fully-connected (FC) or classification layer. Within the convolution layer, one or more filter maps (also known as "kernels") are convoluted with one or more input maps and an activation function is applied to the result of the convolution to highlight potentially relevant outputs and reduce the effect of potentially irrelevant or inconsequential outputs. Each filter map may be configured to detect a particular feature from the input map, such as edges, curves, colors, and the like. For an initial convolution layer, the input map may include a matrix of pixels forming the image or the matrix of pixels of the image data if the captured image was converted by the portable computing device 104 prior to transmission to the server computing device. For a colored image, three input maps may be used for red pixels, green pixels, and blue pixels, respectively. For a grayscale image, a single input map may be used. Other suitable numbers and/or configurations of input maps may be used at the initial convolution layer. For subsequent convolution layers, the input maps may be the output of the prior layer, such as a pooling layer. The output of the convolution layer may be one or more matrices.

The pooling layers may be used to reduce the size of the output of the preceding convolution layer, thereby reducing the computational cost of the CNN model, while retaining the impact of dominant features within the output of the convolution layer. For example, if the convolution layer includes a filter map for detecting edges, edges within the input map, particularly clearly defined edges, may be result in a prominent value from the convolution layer. This prominent value and its corresponding feature from the input map may be referred to as a dominant feature. In one example, the pooling layer applies a window across each matrix from the convolution layer to encapsulate a subset of values from the matrices and generates smaller output matrices, where each value within the output matrices is function of a given subset of values from the convolution layer matrices that are encapsulated by the window. The values in the output matrices may be, for each step or stride of the window across a given matrix, the average of the values within the window, the maximum value within the window, or another suitable value calculated from the respective convolution output matrix. The output of the pooling layer may then be used as an input to another layer, such as an additional convolution layer or the FC layer.

The convolution layers and the pooling layers may broadly be attributed to feature learning within an image. That is, for an image or image data inputted to the CNN model, the convolution and pooling layers may be configured to extract and highlight features within the pixels of the image that may be used by the FC layer to classify objects within the image. The FC layer may include a set of node functions with corresponding weight parameters. The set of node functions may be arranged in a hierarchy or a set of levels such that an input level of node functions may feed into an intermediate or hidden level of node functions, and the output of the intermediate level may feed into an output level of node functions. The hierarchy configuration of the node functions facilitate improved computational efficiency relative to single-level node functions and to provide increased sensitivity to particular features identified by the convolution and pooling layers. The weight parameters are applied to the node functions to enable the system to emphasize and deemphasize various node functions to increase accuracy of the model as described herein.

The output of the feature learning portion of the CNN model may be flattened (i.e., the one or more output matrices are combined into a one-dimensional vector) and then applied to the node functions and the associated weight parameters. The number of outputs of the FC layer may be equal to the number of predefined classifications specified for the CNN model. A soft-max function may be applied to the output values of the FC layer to normalize the values as probabilities between 0 and 1. The class with the highest probability may be the output of the CNN model for the input image data. In at least some embodiments, to facilitate recognition of multiple objects within an image captured by the portable computing device 104, the image data may be segmented (overlapping segments or separate segments) and provided as inputs to the CNN model to detect multiple objects within the captured image. In certain embodiments, an initial image analysis may be performed to identify potentially relevant or potentially irrelevant portions of the image data. In such embodiments, the potentially relevant portion may be extracted to be applied to the CNN model or the potentially irrelevant portions may be removed prior to inputting the image data through the CNN model.

In some embodiments, certain classifications may result in applying at least a portion of the image data to an addition model or additional steps. For example, if text is detected in the image data, particularly text proximate to a detected progressive meter, the CNN model (or another model) may be used to perform optical character recognition (OCR) to determine the content of the text, such as value of the progressive jackpot indicated by the progressive meter. In other embodiments, the OCR may be incorporated into the CNN model, and the text may not require additional steps for determining the content.

The CNN model may incorporate deep learning to refine the CNN model's ability to accurately detect and classify objects within image data. More specifically, at least some of the layers include parameters that may be adjusted in response to errors to guide the outputs of the CNN model to increased accuracy. For example, the filter maps or the weight parameters of the node functions may be adjusted in response to incorrect classifications. In the example embodiment, the server computing device 106 (or another device from which the server computing device 106 receives the CNN model) is configured to train the CNN model by providing input data having known output classifications.

In the example embodiment, the input data for training may be a plurality of images including objects with known classifications. The objects may include, but are not limited to, progressive meters, game interfaces, text, numbers, and the like. The number of images may be substantial (e.g., tens or hundreds of thousands) of varying forms of objects (particularly varying progressive meters), angles from which the images were captured, and the like. As the input data is provided to the CNN model for training, the actual output is compared to the known output from training data, and error correction may be performed via backpropagation. The training may continue until the CNN model reaches an accepted level of accuracy. Although the accepted level of accuracy may be subjective, in one example, the accepted level of accuracy may be set to be approximate to or exceed an average human accuracy of progressive meter readings when accounting for human errors (e.g., incorrect data entry).

At this point, the CNN model may be deployed for use by the system 100 as described herein. However, even though training may be completed, further refinement of the CNN model may occur during deployment. That is, the system 100 is configured such that the technician 101 or another operator may provide feedback based on the classification from the CNN model as described herein. If classification was incorrect, the CNN model may be updated to attempt to avoid similar errors.

It is to be understood that the foregoing description of the CNN model is for exemplary purposes only and is not intended to limit the scope of the disclosure to CNN models. Rather, other ML models (including a plurality of CNN models) and/or other suitable image analysis techniques and processes may be used to analyze the images with progressive meters as described herein. Moreover, in certain embodiments, the portable computing device 104 may be configured to perform at least some of the functions of the server computing device 106 as described herein, include image analysis using a CNN model. In such embodiments, the server computing device 106 may be excluded from the system 100.

In the example embodiment, the server computing device 106 is communicatively coupled to the progressive jackpot database 108. The progressive jackpot database 108 is configured to store data related to progressive jackpots and the associated progressive meters. For example, an entry within the progressive jackpot database 108 may include, but is not limited to, a jackpot identifier, a machine identifier, a game identifier, a maximum progressive value, a current progressive value, a timestamp for the current progressive value, and/or other suitable data associated with progressive jackpots. The jackpot identifier may identify which progressive jackpot is associated with the entry. The machine identifier may identify which gaming machine 102 is associated with the entry, and the game identifier may identify the game conducted by the gaming machine 102. In some embodiments, a "gaming identifier" may be referred to herein interchangeably with the machine identifier, the game identifier, or a combination thereof. The maximum progressive value is the maximum value at which the progressive jackpot can reach. The current progressive value indicates that amount accrued for the progressive jackpot at the corresponding timestamp. Historical progressive values and corresponding timestamps may also be stored to facilitate review for verifying fund allotment and distribution for the progressive jackpots. In some embodiments, the progressive jackpot database 108 may further be configured to store image data of one or more progressive meters. In such embodiments, the progressive jackpot database 108 may store image data from the portable computing device 104 and/or training data for the CNN model of the server computing device 106.

In addition to or in place of storing the current progressive values in the progressive jackpot database 108, the server computing device 106 may be configured to transmit the current progressive value (and other associated data) to external systems for storage, verification, and/or monitoring of the current progressive value. For example, the server computing device 106 may transmit the current progressive value to an accounting system that verifies the current progressive value using the transaction data generated and stored by the accounting system.

The system 100 may be used for gaming environments with a plurality of gaming machines 102 and a plurality of progressive jackpots such that one or more technicians 101 with their respective portable computing devices 104 capture images of gaming interfaces with progressive meters to facilitate monitoring the current progressive value of each progressive jackpot and to verify that the current progressive values presented to players matches the values according to the backend processing within the game network 110. That is, the gaming machines 102, the server computing device 106, and/or another suitable device (e.g., a separate server system for transaction accounting) may track the current progressive value of one or more progressive jackpots, and this backend-calculated value may be compared to the current progressive value presented by the gaming interface. If inconsistencies are detected, a resolution process may be initiated to identify the cause of the inconsistency and resolve the cause. The resolution process may be performed manually, partially automated (e.g., the system 100 or another suitable device identifies suspicious events or data for an operator to review and resolve), or automatically.

Figure 5:
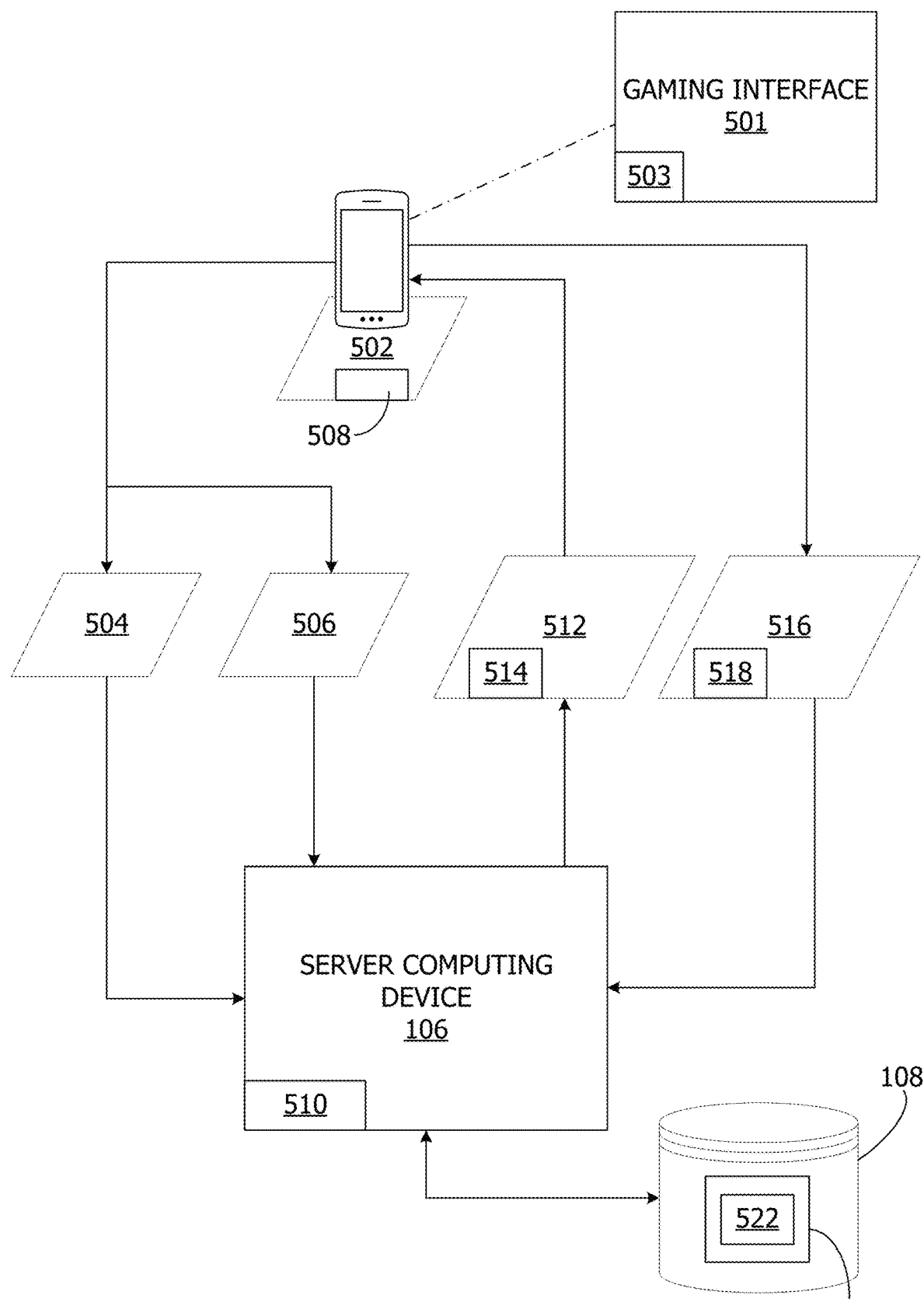
FIG. 5 is a data flow diagram for managing progressive jackpots using the gaming system shown in FIG. 4 according to one or more embodiments of the present disclosure.

FIG. 5 is a data flow diagram for managing progressive jackpots using the system 100 shown in FIG. 4. More specifically, FIG. 5 depicts the data flow of a process for verifying a current progressive value of a progressive meter 503 that is presented on a gaming interface 501. The progressive meter 503 is a visual indicator of the current progressive value and/or the progress towards a maximum progressive value. The meter 503 may include one or more visual elements to convey this information, such as, and without limitation, text, numbers, images, visual meters, and/or the like.

In the example embodiment, the technician 101 (shown in FIG. 4) uses his or her portable computing device 104 to capture an image 502 using the at least one image sensor 124 (shown in FIG. 4) of the portable computing device 104. The image 502 is captured to include at least a portion of the gaming interface 501 including the progressive meter 503. The image 502 may include a plurality of pixel values arranged in a matrix that, when presented together, form the visual image 502. The pixel values may include, for example, color data, intensity (or brightness) data, and/or other suitable data associated with the visual appearance of each pixel. The image 502 may include additional data beyond the pixel values, such as metadata. The metadata may include, for example, a timestamp, resolution information, and the like. In some embodiments, the portable computing device 104 may be configured to provide assistance to the technician 101 in capturing an image 502 for the subsequent image analysis described herein. For example, the portable computing device 104 may present a preview image to the technician 101 with visual guides to align the gaming interface 501 in the image 502. In another example, the portable computing device 104 may perform at least some preliminary image analysis to determine if the image 502 is acceptable (e.g., clear view of the progressive meter).

In the example embodiment, the portable computing device 104 then transmits image data 504 associated with the image 502 to the server computing device 106. The image data 504 may be the image 502 itself or converted from the image 502. In certain embodiments, the image data 504 is encoded or compressed to facilitate reduced computing, memory, and/or network resource allocation to the transmission. For example, the portable computing device 104 may reduce the resolution of the image 502 and convert the reduced-resolution version to grayscale to generate the image data 504. Other suitable conversions or compressions of the image 502 to the image data 504 may occur while maintaining the characteristics in the pixel values that enable the server computing device 106 to detect progressive meters and/or current progressive values as described herein. In one example, the image data 504 may be decoded to extract the original image 502 in response to the server computing device 104 receiving the image data 504.

In at least some embodiments, the portable computing device 104 may also transmit a gaming identifier 506 to the server computing device 106. The gaming identifier 506 identifies the gaming machine 102, the game conducted on the gaming machine 102, and/or the progressive jackpot associated with the gaming interface 501 captured in the image 502. The gaming identifier 506 may be determined and/or generated by the portable computing device 104 via user input or automatic detection. In one example, the technician 101 manually enters the gaming identifier 506 into the portable computing device 104. In another example, the technician 101 may use the portable computing device 104 to scan one or more optical identifiers 508 to retrieve the gaming identifier 506. The optical identifier 508 may be any suitable optical code, such as a quick response (QR) code, a barcode, or text presented on an interface, that the portable computing device 104 decodes to extract the gaming identifier 506. The optical identifier 508 may be captured within the image 502 or a separate image. In certain embodiments, the separate image including the optical identifier 508 is transmitted to the server computing device 106 for the server computing device 106 (or another intermediary device) to decode the gaming identifier 506. In other embodiments, the gaming identifier 506 may be extracted from data collected using other sensors, such as sensors for radio-frequency identification (RFID), near-field communication (NFC), Bluetooth, audio, and the like. The devices configured to broadcast or maintain the encoded gaming identifiers, such as the optical identifiers 508, may be installed in proximity to and/or on the gaming machine 102 and/or the gaming interface including the progressive meter. In certain embodiments, the optical identifier 508 may be presented within the gaming interface 501 and/or another suitable interface.

In some embodiments, the portable computing device 104 may be configured to perform image analysis prior to transmitting the image data 504 and the gaming identifier 506 to the server computing device 106. For example, the gaming identifier 506 may be used to query a database associated with gaming identifiers to retrieve known information about the game, the gaming machine 102, and/or the gaming interface 501. This known information may be compared to the image 502 and/or the image data 504 to identify corresponding objects or features within the image 502. For example, the gaming interface 501 may have a known location for progressive meters 503. The portable computing device 104 may be configured to detect the known location of the progressive meter 503 within the gaming interface 501 and extract that portion of the image 502 for the image data 504 to be sent to the server computing device 106. In certain embodiments, the database associated with the gaming identifiers may not be limited to queries using gaming identifiers 506, but may also be searched manually (e.g., the portable computing device 104 presents data from the database to the technician 101 to locate the corresponding known information for the gaming interface 501). In other embodiments, the image analysis may be performed by the server computing device 106.

The image data 504 and the gaming identifier 506 are received by the server computing device 106. The server computing device 106 may then input the image data 504 to a neural network model 510 to detect any progressive meters present within the image data 504. In the example embodiment, neural network model 510 is a CNN model trained to identify at least progressive meters within images. In at least some embodiments, the CNN model 510 may be trained to identify text and values within images. In other embodiments, other suitable neural network models and/or other suitable image analysis units may be used instead of or in combination with the CNN model 510. The CNN model 510 is stored in memory of the server computing device 106 such that at least one processor of the server computing device 104 is configured to execute instructions related to the CNN model 510 using input data to generate one or more outputs. The output may include at least a classification indicating at least the likelihood of a progressive meter present within the image 502 of the image data 504. If the classification is determined to have a relatively high likelihood, the server computing device 106 may output the classification from the CNN model 510. To narrow this classification to an area (i.e., a subset of the plurality of pixels forming the image 502) within the image 502, the image data 504 may be divided into a plurality of sub-images to be input into the CNN model 510. The server computing device 104 may identify where, within the image data 504, any detect progressive meter (e.g., the progressive meter 503) may be.

The server computing device 104 may then be configured to determine the current progressive value of a detected progressive meter 503. In some embodiments, the CNN model 510 may be configured to detect text near or overlapping the progressive meter 503 as, in at least some embodiments, this text may be assumed to be related to the progressive meter 503. The server computing device 106 may be configured to identify text leading or ending with a currency denomination (e.g., "$", "€", "credits", etc.) as a value, and if only one value is detected, this value may be assumed to be the current progressive value. If multiple instances of text or values are detected near the progressive meter 503 within the image data 504, the server computing device 106 may determine which instance of text is associated with the current progressive value of the progressive meter 503. For example, referring back to FIG. 3, the "$10,000" and "$4,400" may be assumed to be associated with the progressive meter 90. The server computing device 106 may be configured to compare the two instances of text to infer which is the current progressive value and which is the maximum progressive value. To achieve this, the server computing device 106 is configured to perform optical character recognition (OCR) to extract computer-readable numbers and text from the image data 504. The OCR process may be similar to the CNN model 510 or performed using the CNN model 510 by analyzing pixels of image data 504 for visual features representing alphanumerical characters and, if the visual features are substantially consistent with a character, generating the character in a computer-readable format, such as ASCII.

In other embodiments, other suitable methods may be used to extract the current progressive value. For example, the gaming interface 501 may include one or more optical identifiers 508 associated with the progressive meter 503. At least one of the optical identifiers 508 may be encoded with the current progressive value. The portable computing device 104 or the server computing device 106 may be configured to extract the current progressive value from the optical identifier 508. In certain embodiments, the OCR process and the optical identifiers 508 may be used in combination to determine the current progressive value.

To confirm the validity of the current progressive value, the server computing device 106 may be configured to generate and transmit a verification message 512 to the portable computing device 10 for the technician to review. The verification message 512 includes at least the determined current progressive value 514, though additional data may be included. For example, a timestamp associated with the current progressive value 514 and/or the image data 504 may be included in the verification message. In another example, the gaming identifier 506 and/or at least a portion of the image data 504 may be transmitted to the portable computing device 104 as part of the verification message 512. The format and transmission protocol of the verification message 512 may be any suitable configuration to facilitate transmission to the portable computing device 104. For example, the verification message 512 may be transmitted via text message, email, or another data message type. In response to receiving the verification message 512, the portable computing device 104 is configured to present the current progressive value 514 (e.g., via a display device of the portable computing device 104) to the technician 101. The technician 101 can review the current progressive value 514 to determine whether or not the current progressive value 514 as determined by the server computing device 106 aligns with the current progressive value captured within the image 502 by the technician 101. In other embodiments, the verification message 512 may be transmitted to a different device other than the portable computing device 104 for review and approval.

In the example embodiment, in response to the technician 101 providing user input indicating approval or denial of the current progressive value 514, the portable computing device 104 is configured to generate a value response 516 to be sent back to the server computing device 106. The server computing device 106 receives the value response 516 and, based on the approval or denial by the technician, stores a progressive value in the progressive jackpot database 108. In response to value response 516 indicating approval of the current progressive value 514, the server computing device 106 may store the current progressive value 514. If the technician 101 declines the current progressive value 514 (e.g., the value was inconsistent with the captured image 502 and/or the value as observed by the technician 101), the portable computing device 104 may prompt the technician 101 to input a valid or authorized progressive value 518. The authorized progressive value 518 is transmitted to the server computing device 106 with the value response 516 declining the current progressive value 514. The server computing device 106 then stores the authorized progressive value 518 in place of the current progressive value 514 in the progressive jackpot database 108. In certain embodiments, the portable computing device 104 may be in communication with the progressive jackpot database 108 to directly store the progressive values 514, 518 within the progressive jackpot database 108. That is, in such embodiments, the value response 516 may not be sent to the server computing device 106, but rather the portable computing device 106 may store the current progressive value 514 or the authorized progressive value 518 within the progressive jackpot database 108 directly.

In certain embodiments in which the technician 101 is checking multiple gaming machines 102, at least some of the foregoing data may be transmitted combined with data associated with other gaming machines 102 and/or gaming interfaces 501, thereby reducing the network resources allocated to the data transmission between the portable computing device 104 and the server computing device 106. For example, the value response 516 may not be transmitted back to the server computing device 106 until a threshold (e.g., number of machines or data limit) is reached or the technician 101 has completed his or her allocated gaming machines 102 for a period of time (e.g., a day). In some embodiments, the portable computing device 104 may store at least some data, such as the current or authorized progressive value of each gaming machine 102 to generate a report.

In at least some embodiments, the CNN model 510 is configured to adapt dynamically to real-world feedback.

That is, the server computing device 106 may update the CNN model 510 in response to the value response 516 to refine the CNN model 510 to the actual images of progressive meters being captured during operation. For example, if a value response 516 indicates that the current progressive value 514 is declined, the weighting parameters and other adjustable elements of the CNN model 510 may be adjusted to try to avoid subsequent misidentification of progressive values and/or progressive meters. In certain embodiments, value responses 516 confirming the current progressive value 514 may also cause the server computing device 106 to update the CNN model 510 to reinforce the correct classification and character recognition. In some embodiments, additional or alternative processes may be used to adjust the CNN model 510. For example, additional training data may be received for conducting additional training. In one example in which multiple systems 100 (shown in FIG. 4) are interconnected, the server computing device 106 of each system 100 may distribute updated weighting parameters or training data to other server computing devices 106 to update the respective CNN models 510. In other embodiments, the CNN model 510 (or other suitable image analysis subsystem implemented by the server computing device 106) may not be updated outside of a training process.

In the example embodiment, the progressive jackpot database 108 is configured to store one or more jackpot tables 520 for tracking and verifying the value and/or transactions of progressive jackpots. In particular, the jackpot table 520 includes a plurality of jackpot entries 522 associated with one or more progressive jackpots. A single jackpot entry 522 may represent a progressive jackpot or a single event and/or transaction associated with a particular progressive jackpot. For example, one jackpot entry 522 may be generated in response to the progressive jackpot database 108 receiving the current progressive value 514 or the authorized progressive value 518. The jackpot entries 522 may include a plurality of data elements for monitoring and tracking events and/or values associated with the progressive jackpots. For example, a jackpot entry 522 may include, but is not limited to, a jackpot identifier, a gaming identifier, a current progressive value, a timestamp associated with the current progressive value, a technician identifier, device identifier (i.e., for the portable computing device 104), and/or a network progressive value (i.e., the current progressive value received from the gaming machine managing the progressive jackpot via a game network).

These elements may be generated by the progressive jackpot database 108 or received from another suitable device (e.g., the server computing device 106). For example, in addition to the current progressive value 514 or the authorized progressive value 518, the server computing device 106 may also transmit the jackpot identifier, the gaming identifier, the technician identifier, and/or the device identifier to the progressive jackpot database 108. To generate the jackpot entry 522 in response to the received data from the server computing device 106, the progressive jackpot database 108 may perform a lookup within the jackpot table 520 (or an additional table, such as a key) using the received data to populate additional fields or data elements of the entry 522 with previously stored data. In one example, the gaming identifier and the device identifier may be transmitted to the progressive jackpot database 108 with the current progressive value 514 (and its corresponding timestamp), and the entry 522 may be populated with the corresponding jackpot identifier and technician identifier associated with the received gaming and device identifiers, respectively.

The jackpot table 520 may be configured to facilitate various table functions, such as, and without limitation, lookups, filtering, sorting, entry comparison, element comparison, and the like. For example, discrepancies between the current progressive value 514 (or the authorized progressive value 518) and the network progressive value of an entry 522 may be detected and highlighted using table functions. That is, an operator may manually access the jackpot table 520 to verify whether or not any issues are present within the jackpot table, or a device configured to monitor the jackpot table 520 (e.g., the server computing device 106) may identify potential discrepancies and notify the operator to begin a resolution process. The resolution process may be a manual, semiautomatic, or automatic process of auditing various events and transactions reported by the system 100 and/or other accounting systems to identify potential causes of the identified discrepancies and resolving the causes if possible. In certain embodiments, the resolution process may be performed by the server computing device 106.

Figure 6:
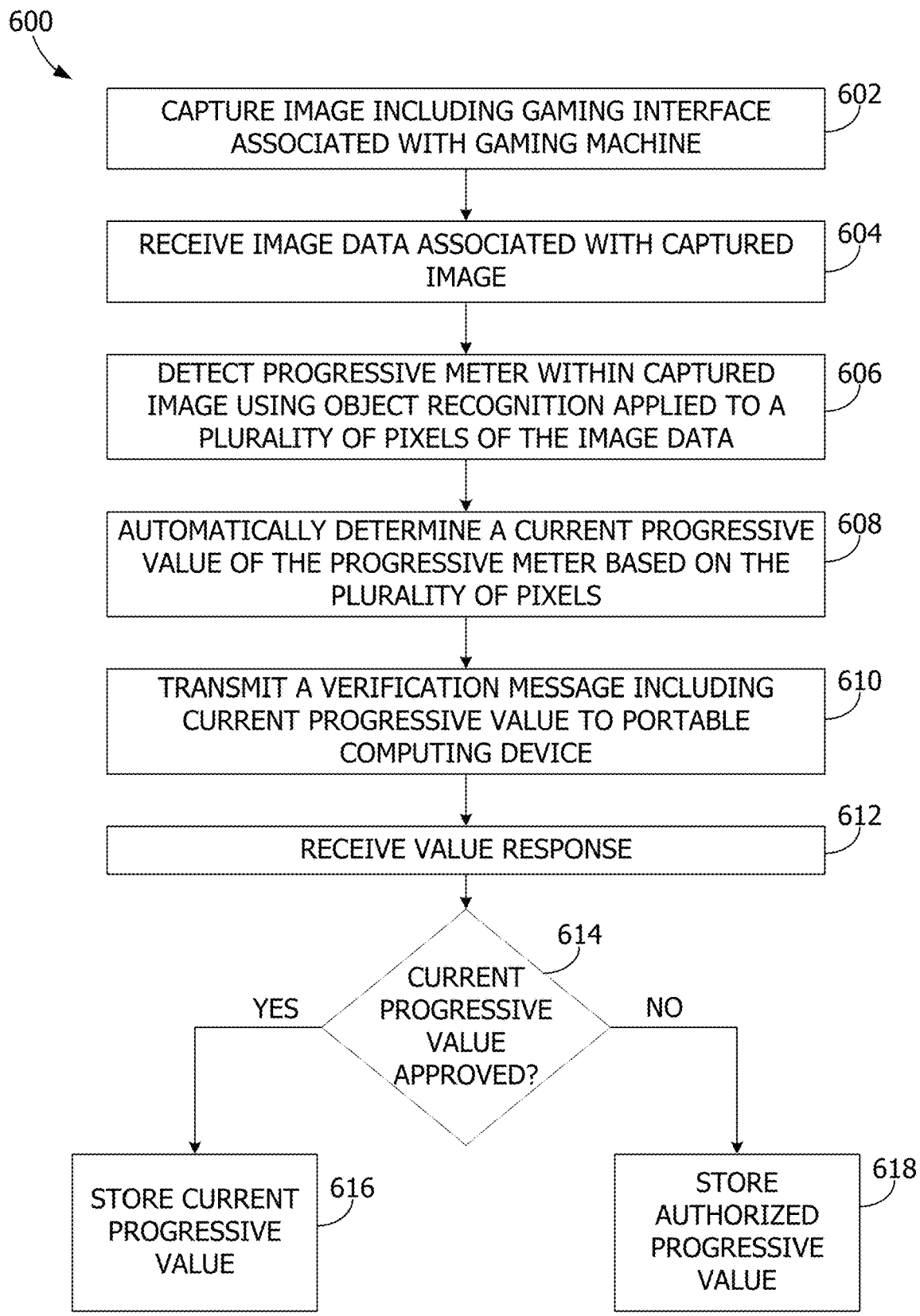
FIG. 6 is a flow diagram of an example method of managing progressive jackpots according to one or more embodiments of the present disclosure.

FIG. 6 is a flow diagram of an example method 600 of managing progressive jackpots using a gaming system, such as the system 100 shown in FIG. 4. The method 600 may be at least partially performed using logic circuitry of the system 100. The logic circuitry may include, but is not limited to, the logic circuitry 40 (shown in FIG. 2), the logic circuitry of the portable computing device 104 (e.g., processors 118 and memory 120), and/or the logic circuitry of the server computing device 106 (e.g., processors 126 and memory 128). For exemplary purposes only, the steps of the method 600 are described herein being performed using one configuration of the portable computing device 104 and the server computing device 106, though it is to be understood that other configurations and division of functionality (including some configurations where the functionality described herein is performed entirely by one device) may be implemented using the method 600. In other embodiments, the method 600 may include additional, fewer, or alternative steps, including those described elsewhere herein.

With reference to FIGS. 4 and 6, the technician uses the portable computing device 104 captures 602 an image including a gaming interface associated with the gaming machine 102 using at least one image sensor. The gaming interface includes at least one progressive meter that indicates a progressive value to players at the gaming machine 102 and any other gaming machine associated with the progressive jackpot. The portable computing device 104 then generates image data from the captured image and any other additional information associated with the image. For example, the portable computing device 104 may determine timestamp for the image, a gaming identifier associated with the gaming machine 102, and one or more identifiers for indicating the identity of the technician 101 and/or the portable computing device 104. The image data (and any additional data associated with the image) may then be transmitted to the server computing device 106 for image analysis.

In response to receiving 604 the image data from the portable computing device 104, the server computing device 106 performs object recognition and segmentation on a plurality of pixels of the image data to detect 606 any progressive meters captured within the image. The plurality of pixels may be the entirety of the pixels forming the image data or a subsection of pixels. The object recognition and segmentation may be performed using one or more neural networks trained to detect at least progressive meters and the associated progressive values. In the example embodiment, a CNN model may be used, and the pixels from the image data may be used as inputs to the CNN model. The output of the CNN model may indicate which pixels, if any, are associated with a progressive meter detected 606 within the image data (and, by extension, within the captured image).

The server computing device 106 automatically determines 608 a current progressive value of a detected progressive meter based on the plurality of pixels of the image data. For example, the object recognition and segmentation performed by the server computing device 106 may include detecting text or numbers within the image data. The server computing device 106 may be configured to determine whether or not detected text or numbers (or another indicator of a value) is associated with a detected progressive meter based at least partially on the proximity of pixels of the image data that are associated with the text to pixels of the image data that are associated with the progressive meter. In certain embodiments, contextual clues provided by the text or numbers themselves may be used to identify the current progressive value. For example, numbers detected near text including the terms "Jackpot" and/or "Prize" may be assumed to be the current progressive value in some instances. In other embodiments, the current progressive value may be automatically determined 608 by decoding one or more optical identifiers from the image data and/or decoding other sensor data captured by the portable computing device 104.

In response to determining 608 the current progressive value, the server computing device 106 transmits 610 a verification message including the current progressive value to the portable computing device 104 for the technician 101 to review. The technician 101 provides user input at the portable computing device 104 indicating whether or not the current progressive value is approved. The portable computing device 104 generates a value response indicating the approval or denial of the current progressive value and transmits the value response to the server computing device.

The server computing device 106 receives 612 the value response and determines 614 whether or not the current progressive value has been approved by the technician 101. In response to the value response indicating approval, the server computing device 106 stores 616 the current progressive value within the progressive jackpot database 108. In response to the value response indicating denial, the server computing device 106 may extract an authorized progressive value from the value response. The authorized progressive value originates from user input provided by the technician 101 in response to the verification message. That is, if the technician 101 declines the current progressive value, the portable computing device 104 prompts the technician 101 to enter the authorized progressive value to be used in place of the current progressive value. The authorized progressive value may then be included within the value response for the server computing device 106 to extract and store 618 within the progressive jackpot database 108 in place of the declined current progressive value. Other additional data associated with the image may also be stored in the progressive jackpot database 108 with the progressive value, such as a timestamp, a gaming identifier, a jackpot identifier, a device identifier, a technician identifier, a network progressive value, an indicator for specifying whether or not the current progressive value was accepted, and the like. These stored values may be linked together into one or more entries within a jackpot table, which may be used to track and monitor progressive jackpots.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A gaming system for progressive meter management, the gaming system comprising logic circuitry configured to:
   receive image data associated with an image captured by at least one image sensor of a portable computing device, the captured image including a gaming interface associated with a gaming machine;
   detect a progressive meter within the captured image using object recognition and segmentation applied to a plurality of pixels of the image data, the progressive meter associated with a progressive jackpot linked to the gaming machine;
   automatically determine a current progressive value of the progressive meter based on the plurality of pixels of the image data;
   transmit a verification message including the current progressive value to the portable computing device;
   in response to the verification message, receive a value response from the portable computing device; and
   in response to the value response approving the current progressive value, store the current progressive value for the progressive jackpot in a progressive jackpot database.

2. The gaming system of claim 1, wherein the object recognition and segmentation is performed by inputting the plurality of pixels into a convolutional neural network (CNN) model of the logic circuitry.

3. The gaming system of claim 2, wherein the CNN model is updated using the image data in response to the value response declining the current progressive value.

4. The gaming system of claim 1 further comprising a server computing device, wherein the logic circuitry includes server logic circuitry of the server computing device and mobile logic circuitry of a portable computing device.

5. The gaming system of claim 1, wherein the logic circuitry is configured to:
   receive a gaming identifier associated with at least one of the gaming machine or a game conducted by the gaming machine; and
   compare the image data associated with the captured image to stored image data associated with the gaming identifier to detect the progressive meter within the captured image.

6. The gaming system of claim 5, wherein the image data includes an optical identifier, the logic circuitry configured to decode the optical identifier to determine at least one of the gaming identifier or the current progressive value.

7. The gaming system of claim 1, wherein the logic circuitry is configured to:
   receive, in response to the value response declining the current progressive value, an authorized progressive value from the portable computing device; and
   in response to receiving the authorized progressive value, store the authorized progressive value for the progressive jackpot in the progressive jackpot database.

8. The gaming system of claim 1, wherein the image data is generated by the portable computing device by compressing the captured image.

9. A method for managing progressive jackpots, the method comprising:
- receiving, by logic circuitry, image data associated with an image captured by at least one image sensor of a portable computing device, the captured image including a gaming interface associated with a gaming machine;
- automatically determining, by the logic circuitry, a current progressive value of a progressive meter using object recognition and segmentation applied to a plurality of pixels of the image data, the progressive meter associated with a progressive jackpot linked to the gaming machine; and
- transmitting, by the logic circuitry, a verification message including the current progressive value to the portable computing device to verify the current progressive value.

10. The method of claim 9, wherein the object recognition and segmentation is performed by inputting, by the logic circuitry, the plurality of pixels into a convolutional neural network (CNN) model of the logic circuitry.

11. The method of claim 10, wherein the CNN model is updated using the image data in response to receiving user input from the portable computing device declining the current progressive value of the verification message.

12. The method of claim 9 further comprising:
- receiving, by the logic circuitry, a gaming identifier associated with at least one of the gaming machine or a game conducted by the gaming machine; and
- comparing, by the logic circuitry, the image data associated with the captured image to stored image data associated with the gaming identifier to detect the progressive meter within the captured image.

13. The method of claim 12, wherein the image data includes an optical identifier, the method further comprising decoding, by the logic circuitry, the optical identifier to determine at least one of the gaming identifier or the current progressive value.

14. The method of claim 9 further comprising:
- transmitting, by the logic circuitry, a verification message including the current progressive value to the portable computing device;
- in response to the verification message, receiving, by the logic circuitry, a value response from the portable computing device;
- in response to the value response approving the current progressive value, storing the current progressive value for the progressive jackpot in a progressive jackpot database;
- in response to the value response declining the current progressive value, receiving, by the logic circuitry, an authorized progressive value from the portable computing device; and
- in response to receiving the authorized progressive value, storing, by the logic circuitry, the authorized progressive value for the progressive jackpot in the progressive jackpot database.

15. The method of claim 9, wherein the image data is generated by the portable computing device by compressing the captured image.

16. A gaming system comprising logic circuitry configured to:
- receive image data associated with an image captured by at least one image sensor of a portable computing device, the captured image including a gaming interface associated with a gaming machine;
- automatically determine a current progressive value of a progressive meter using object recognition and segmentation applied to a plurality of pixels of the image data, the progressive meter associated with a progressive jackpot linked to the gaming machine; and
- transmit a verification message including the current progressive value to the portable computing device to verify the current progressive value.

17. The gaming system of claim 16, wherein the object recognition and segmentation is performed by inputting, by the logic circuitry, the plurality of pixels into a convolutional neural network (CNN) model of the logic circuitry.

18. The gaming system of claim 17, wherein the CNN model is updated using the image data in response to receiving user input from the portable computing device declining the current progressive value of the verification message.

19. The gaming system of claim 16 further comprising a server computing device, wherein the logic circuitry includes server logic circuitry of the server computing device and mobile logic circuitry of a portable computing device.

20. The gaming system of claim 16, wherein the logic circuitry is configured to:
- receive a gaming identifier associated with at least one of the gaming machine or a game conducted by the gaming machine; and
- compare the image data associated with the captured image to stored image data associated with the gaming identifier to detect the progressive meter within the captured image.

21. The gaming system of claim 20, wherein the image data includes an optical identifier, the logic circuitry configured to decode the optical identifier to determine at least one of the gaming identifier or the current progressive value.

22. The gaming system of claim 16, wherein the logic circuitry is further configured to:
- transmit a verification message including the current progressive value to the portable computing device;
- in response to the verification message, receive a value response from the portable computing device;
- in response to the value response approving the current progressive value, store the current progressive value for the progressive jackpot in a progressive jackpot database;
- in response to the value response declining the current progressive value, receive an authorized progressive value from the portable computing device; and
- in response to receiving the authorized progressive value, store the authorized progressive value for the progressive jackpot in the progressive jackpot database.

23. The gaming system of claim 16, wherein the image data is generated by the portable computing device by compressing the captured image.

* * * * *